United States Patent [19]

Dutt

[11] Patent Number: 4,799,998
[45] Date of Patent: Jan. 24, 1989

[54] PAPERMACHINE CLOTHING

[75] Inventor: William H. Dutt, Rensselaer, N.Y.

[73] Assignee: Albany International Corp., Menands, N.Y.

[21] Appl. No.: 519,007

[22] Filed: Aug. 1, 1983

[51] Int. Cl.⁴ ............................................. D21F 1/10
[52] U.S. Cl. ............................ 162/348; 139/425 A; 162/358; 162/DIG. 1
[58] Field of Search ................... 162/348, 358, DIG. 1

[56] References Cited

U.S. PATENT DOCUMENTS 4,369,218  1/1983  Mazere ............................ 162/358

FOREIGN PATENT DOCUMENTS 2120967  11/1971  Fed. Rep. of Germany ... 162/DIG. 1

Primary Examiner—Peter Chin
Attorney, Agent, or Firm—Kane, Dalsimer, Sullivan, Kurucz, Levy, Eisele and Richard

[57] ABSTRACT

Papermachine clothing is described, made up of synthetic, polymeric resin fibers which include porous fibers and filaments.

1 Claim, 1 Drawing Sheet

PAPERMACHINE CLOTHING

BACKGROUND OF THE INVENTION

1. Field of the Invention

The invention relates to papermachine clothing and in particular relates to chemically treated papermachine clothing, improved by the use of porus filaments and fibers in their construction.

Brief Description of the Prior Art

Papermachine clothing, i.e.; endless dryer fabrics, wet press felts and forming wires have heretofore been fabricated from a wide variety of natural and synthetic filaments and fibers to meet the specifications required for their use on papermaking machines. In recent years, the felts, fabrics and wires, particularly those made of synthetic polymeric resin materials, have been treated with a wide variety of chemicals to obtain particular physical characteristics. For example, he fabrics making up such papermachine clothings have been treated with resins to obtain abrasion resistance, stiffness and dimensional stability; with chemicals to achieve hydrolysis resistance and other properties. Heretofore, the value of these chemical treatments has been limited to some degree by the ability of the textile fabric of the clothing to retain the chemicals administered in the fabric treatment.

The papermaking machine clothing of the present invention is advantageous over prior art clothings in that the clothing retains desired properties of chemical treatments over extended periods of time.

SUMMARY OF THE INVENTION

The invention comprises in papermachine clothing which comprises a plurality of synthetic, polymeric resin fibers and/or filaments in a cohesive fabric structure, the improvement which comprises; inclusion of porous fibers and/or filaments in the fabric structure.

DETAILED DESCRIPTION OF THE PREFERRED EMBODIMENTS OF THE INVENTION

Conventional papermachine clothing including dryer felts, wet-press felts and forming wires made of synthetic, polymeric resin fibers and filaments are well known as are methods of their manufacture. Representative of such papermachine clothings and the methods of their fabrication are those described in U.S. Pat. Nos. 3,399,111; 3,613,258; 3,617,442; 3,839,136; 3,867,766; 3,928,699; 4,107,367; 4,142,557; 4,187,618; 4,196,248; 4,281,689; 4,290,209; and RE 21,890.

In general, the prior art papermaking clothing has been constructed by a putting together of a plurality of synthetic, polymeric resin fibers or filaments in a particular, cohesive fabric structure. For example, forming and dryer fabrics may be fabricated by the interweaving of a plurality of machine direction and cross-machine direction monofilament or multifilament yarns in particular weave patterns withor without selected filling yarns. Wet-press felts and dryer felts may be composite fabrics having woven scrims to which there is needled webs of non-woven, fibrous materials (generally staple fibers). The papermachine clothing may be chemically treated for a wide variety of reasons. For example they may be coated with high-temperature resistant polymeric resins to improve heat- o resistance; with synthetic polymeric resins such as ureaformaldehyde resins to improve abrasion resistance; with high temperature resistant resins to improve running life and wad burning characteristics and like treatments; see for example U.S. Pat. Nos. 4,015,038; 4,162,190 and 4,267,227.

In the process of treating papermaking machine clothing with chemicals to alter fabric properties, the treatment chemical generally adheres to surfaces of fibers in the fabric. There is also a theoretical possibility that the chemical may penetrate into fiber bundles and even into fiber spaces. In the present invention, a proportion of the textile fibers or filaments present in the clothing fabric are made up with porous fibers. Porous fibers are defined herein as fibers or filaments wherein micro-pores may be created in the fibers and filaments by at least two processes, i.e.; by either producing the fiber or filament with the inclusion of a component which is removable by thermal or chemical means or by co-extrusion of reactive components which upon reaction produce pores; see the porous fibers. and filaments described in U.S. Pat. Nos. 3,303,045; 3,785,919; 4,157,424 and 4,252,855. The presence of micro pores in the porous fibers or filaments permit and facilitate improved penetration of the fibers by chemicals applied in chemical treatments.

Figure 1:
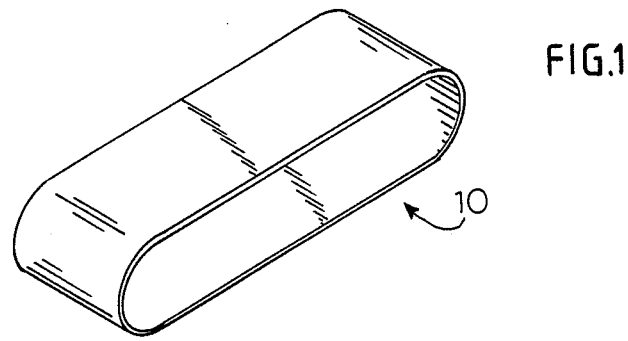
FIG. 1 is a view-in-perspective of an embodiment papermachine clothing belt of the invention, representative of a dryer belt, a wet-press felt or a forming wire.
Figure 2:
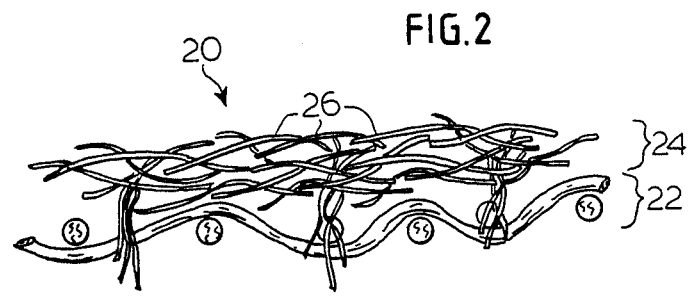
FIG. 2 is a cross-sectional, side elevation, enlarged, of a portion of the fabric making up the belt of FIG. 1, above.
Figure 3:
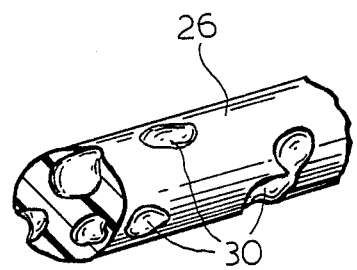
FIG. 3 is an enlarged view of a fiber found in the fabric shown in FIG. 2, above.

Referring now to FIG. 1, there is seen an embodiment papermachine clothing belt 10 of the invention, seen in a perspective view. The belt 10 is representative of a dryer felt, a wet-press felt or a forming wire. FIG. 2 is a cross-sectional, enlarged side view of a wet-press felt fabric 20, again representative of clothing of the invention and including a woven scrim 22 base to which there has been needled a non-woven web 24 of a plurality of textile staple fibers 26. An enlarged view of a fiber 26 as shown in FIG. 3 shows that the fiber 26 is a porous fiber bearing a plurality of pores 30. The fabric 20 which may be partly or wholly composed of fibers or filaments which are porous can be more effectively treated with chemicals to improve the fabric performance.

What is claimed:

1. In papermachine clothing which comprises a plurality of synthetic, polymeric resin fibers and/or filaments in a cohesive fabric structure, the improvement which comprises; inclusion of porous fibers and/or filaments in the fabric structure.

* * * * *